United States Patent
Fenderson

(10) Patent No.: US 6,569,398 B2
(45) Date of Patent: May 27, 2003

(54) METHOD FOR TREATING HYDROGEN SULFIDE-CONTAINING WASTE GASES

(75) Inventor: Steve Fenderson, Gladewater, TX (US)

(73) Assignee: GAA Engineered Systems, Inc., Tyler, TX (US)

( * ) Notice: Subject to any disclaimer, the term of this patent is extended or adjusted under 35 U.S.C. 154(b) by 0 days.

(21) Appl. No.: 09/846,659

(22) Filed: Apr. 30, 2001

(65) Prior Publication Data

US 2002/0159938 A1 Oct. 31, 2002

(51) Int. Cl.$^7$ .......................... C01B 17/02; C01B 17/04
(52) U.S. Cl. ............................... 423/573.1; 423/574.1; 423/576.2; 423/576.4; 423/576.8; 423/578.1
(58) Field of Search .......................... 423/573.1, 574.1, 423/576.2, 576.8, 578.1, 576.4

(56) References Cited

U.S. PATENT DOCUMENTS

| | | | | |
|---|---|---|---|---|
| 4,155,976 A | * | 5/1979 | Drake et al. ................... | 422/41 |
| 4,478,811 A | * | 10/1984 | Hass ....................... | 423/574 R |
| 5,632,967 A | * | 5/1997 | Nasato ..................... | 423/578.1 |
| 5,935,548 A | * | 8/1999 | Franklin et al. ......... | 423/578.1 |

* cited by examiner

Primary Examiner—Stacy S. Silverman
Assistant Examiner—Timothy C. Vanoy
(74) Attorney, Agent, or Firm—Sonnenschein, Nath & Rosenthal

(57) ABSTRACT

Disclosed is a method in which hydrogen sulfide-containing liquid sulfur is introduced into a containment vessel to partially fill the containment vessel and create a hydrogen sulfide-containing liquid sulfur phase and a hydrogen sulfide-containing vapor phase. A portion of the hydrogen sulfide-containing liquid sulfur phase is then treated to produce a liquid sulfur-containing phase and a gaseous hydrogen sulfide-containing phase, such that the gaseous hydrogen sulfide-containing phase has a pressure of at least about 60 psig. A portion of the hydrogen sulfide-containing vapor phase is then withdrawn from the containment vessel using at least one eductor driven by a motive fluid, where the motive fluid is the gaseous hydrogen sulfide-containing phase from the container vessel. The hydrogen sulfide-containing waste gas stream exiting the eductor is then treated to reduce the hydrogen-sulfide content of the waste gas.

18 Claims, 4 Drawing Sheets

METHOD FOR TREATING HYDROGEN SULFIDE-CONTAINING WASTE GASES

BACKGROUND OF THE INVENTION

1. Field of the Invention

This invention relates to the chemical arts. In particular, it relates to a method for treating hydrogen sulfide-containing waste gases.

2. Discussion of the Related Art

An important process for removing hazardous hydrogen sulfide ($H_2S$) from various waste gases, including gases produced during the refining of petroleum products, is the modified Claus process. It involves the following net reaction:

  (1)

and produces steam and liquid sulfur.

In plants employing the modified Claus process, known as sulfur recovery units or "SRU's," the liquid sulfur is collected in enclosed pits. The thus recovered liquid sulfur is not pure, but contains residual $H_2S$. The $H_2S$ is present not only in the form of $H_2S$ dissolved in the liquid sulfur, but in the form of polysulfides ($H_2S_x$). The gradual decomposition of the polysulfides in the liquid sulfur produces additional hydrogen sulfide by the process illustrated in the following equation:

  (2)

(dissolved in liquid S) (dissolved in liquid S) (liquid phase)

Methods for purifying the liquid sulfide are known. For example, U.S. Pat. No. 5,632,967, to Nasato, which patent is herein incorporated by reference, describes removing both the $H_2S$ and the $H_2S_x$ by intimately mixing a stream of the liquid sulfur with a stream of an oxidizing gas and passing the streams through a vessel at a pressure of at least about 40 psig.

However, prior to purification, the dissolved $H_2S$ can pass by physical desorption from the liquid sulfur into the vapor space in the enclosed collection pit above the liquid sulfur. This can give rise to potentially dangerous conditions, if the concentration of $H_2S$ reaches its lower explosive or flammability limit. (3.4 vol % under normal pit operating conditions.)

Consequently, to prevent fires and explosions, SRU's generally utilize an air sweep through the vapor space of the collecting pit. The pit sweep air is typically induced into the pit from ambient air by creating a draft—using either a heated natural draft stack, a motor driven blower or a steam driven eductor. The pressure of the gas exiting the blower or eductor is normally about 2 psig.

When the sweep gas leaves the collecting pit it contains $H_2S$, sulfur vapor, and in some instances sulfur dioxide ($SO_2$) produced from the reaction of air with $H_2S$ and/or sulfur. It is a drawback of these conventional methods for inducing the sweep gas that they limit subsequent treatment of the gas. For example, the pit vapors are simply discharged into the atmosphere when a natural draft stack is employed. When motor driven blowers or steam driven eductors are used, the sweep gas is normally sent to a thermal incinerator where the sulfur compounds are oxidized to $SO_2$ before discharging into the atmosphere. Consequently, all of these methods result in $H_2S$ and/or $SO_2$ being released into atmosphere.

Therefore, there exists a definite need for an improved method of treating sweep gases that minimizes or substantially eliminates the discharge of $H_2S$ and/or $SO_2$ into the atmosphere. The present invention satisfies these and other related needs and provides farther related advantages.

SUMMARY OF THE INVENTION

Now in accordance with the invention, there has been found a simple, effective, and inexpensive method for treating sweep gases that minimizes or substantially eliminates the discharge of $H_2S$ and/or $SO_2$ into the atmosphere. Hydrogen sulfide-containing liquid sulfur, typically produced by a sulfur recovery unit, is introduced into a containment vessel, such as a sulfur collection pit, to partially fill the containment vessel and create a hydrogen sulfide-containing liquid sulfur phase and a hydrogen sulfide-containing vapor phase.

A portion of the hydrogen sulfide-containing liquid sulfur phase is then treated to provide a liquid sulfur phase reduced in or essentially free of hydrogen sulfide and a gaseous hydrogen sulfide-containing phase, such that the gaseous hydrogen sulfide-containing phase has a pressure of at least about 60 psig, preferably from about 80 psig to about 120 psig. In some embodiments, the hydrogen sulfide-containing liquid sulfur phase is withdrawn from the containment vessel and introduced, along with an oxidizing gas, preferably air, into a degassing vessel at a pressure of at least about 60 psig, preferably from about 80 to about 120 psig.

A portion of the hydrogen sulfide-containing vapor phase is then withdrawn from the containment vessel using one or more eductors driven by a motive fluid, where the motive fluid is the gaseous hydrogen sulfide-containing phase. The hydrogen sulfide-containing waste gas stream, exiting the eductor at a pressure of from about 6 to about 14 psi, preferably from about 8 to about 12 psi, is then treated to reduce the hydrogen-sulfide content of the waste gas.

In some embodiments, the waste gas stream exiting one or more of the eductors is used as the motive fluid for an additional eductor prior to treatment of the waste gas stream. Also, in some embodiments, the hydrogen sulfide-containing liquid sulfur is produced by a sulfur recovery unit having a burner for combusting a stream of gas and evolving the resulting combustion products into a modified Claus process reactor furnace and the hydrogen-sulfide containing waste gas is treated by feeding the hydrogen-sulfide containing waste gas into the burner. In other alternative embodiments, the hydrogen sulfide-containing liquid sulfur is produced by a sulfur recovery unit having a Wellman Lord-type tail gas clean-up unit for removing hydrogen sulfide from a gas stream and the hydrogen-sulfide containing waste gas is treated by feeding the hydrogen-sulfide containing waste gas into the Wellman Lord-type tail gas clean-up unit; the hydrogen sulfide-containing liquid sulfur is produced by a sulfur recovery unit having in a sodium bisulfite tail gas clean-up unit for removing hydrogen sulfide from a gas stream and the hydrogen-sulfide containing waste gas is treated by feeding the hydrogen-sulfide containing waste gas into the sodium bisulfite tail gas clean-up unit; the hydrogen sulfide-containing liquid sulfur is produced by a sulfur recovery unit having a direct oxidation catalytic converter for converting hydrogen sulfide to sulfur and the hydrogen-sulfide containing waste gas is treated by feeding the hydrogen-sulfide containing waste gas into the direct oxidation catalytic converter; the hydrogen sulfide-containing liquid sulfur is produced by a sulfur recovery unit having a thermal incinerator converting the hydrogen sulfide to sulfur dioxide and the hydrogen sulfide containing waste gas is treated by feeding the waste gas into the thermal incinerator.

DETAILED DESCRIPTION OF THE PREFERRED EMBODIMENTS

Particular embodiments of the invention are described below in considerable detail for the purpose of illustrating its principles and operation. However, various modifications may be made, and the scope of the invention is not limited to the exemplary embodiments described below. For example, while specific reference is made to sulfur pit sweep air recovery, the inventive method can be used to recover waste streams from other near atmospheric pressure tank sweep systems.

Figure 1:
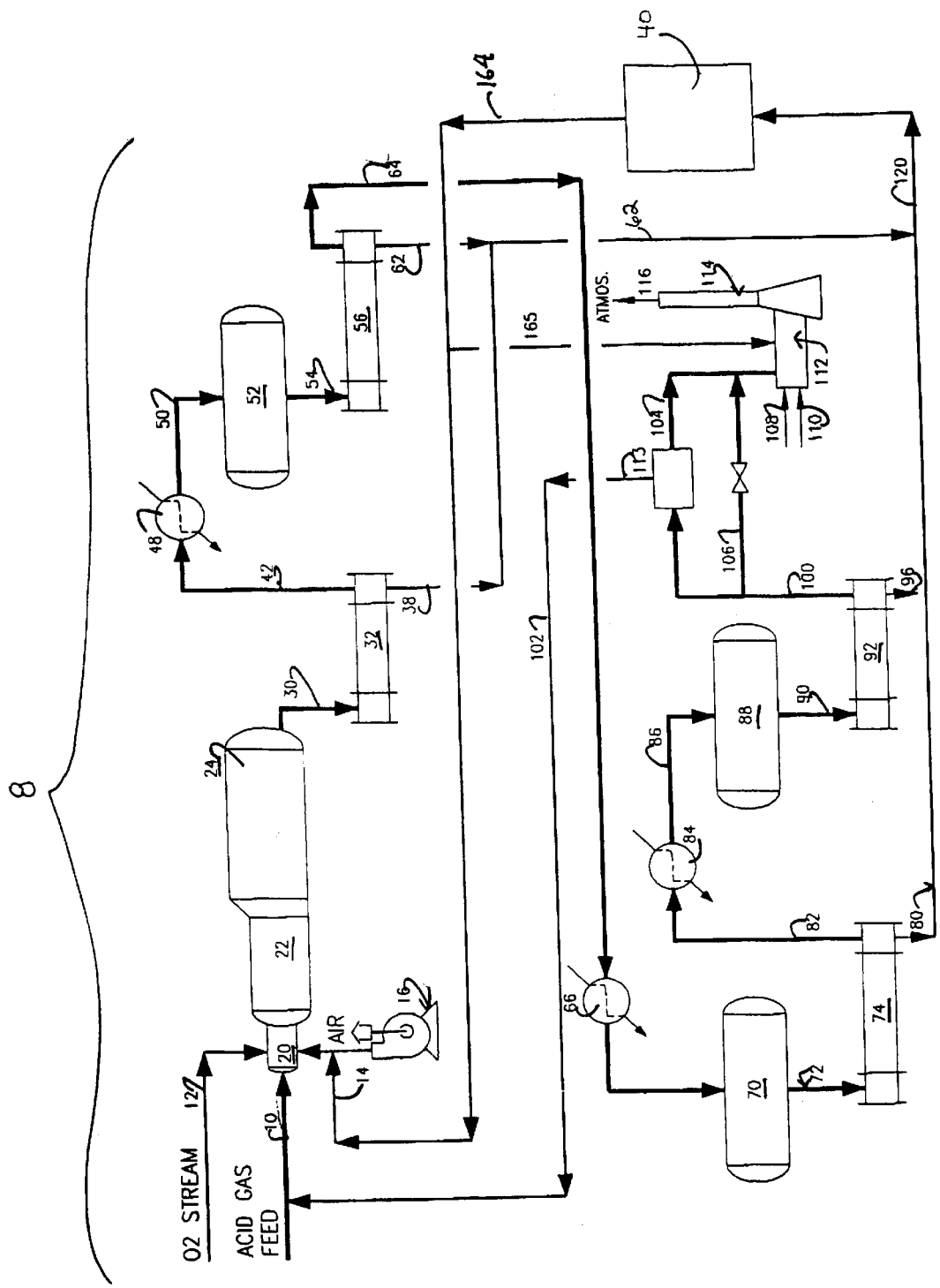
FIG. 1 is a schematic diagram showing an SRU including collection of liquid sulfur to a pit and return of waste gases from the collection pit and related equipment to the SRU for use in practicing the inventive method.

An SRU 8 including a liquid sulfur collection pit and related equipment for use in practicing the inventive method is shown in FIG. 1. A stream of gas containing $H_2S$ flows through line 10 and is introduced into a burner 20 at a pressure of about 6 to about 12 psig. A stream of air, provided through line 14 at elevated pressure from compressor 16 is also introduced into the burner at a pressure of about 6 to about 12 psig. In the oxygen-enriched SRU embodiment shown in FIG. 1, a stream of oxygen is provided through line 12 from an oxygen supply source (not shown) and introduced into the burner in conjunction with or in place of the air stream.

The combined streams are combusted in burner 20 and evolved into a reactor furnace 22, where the modified Claus reaction takes place. The reactor furnace effluent then passes through a waste heat boiler 24 and is cooled. The cooled effluent from the waste heat boiler is carried through line 30 and introduced in a first liquid sulfur condenser 32, where the effluent is again heat exchanged. The condensed liquid sulfur is then carried through line 38, then through lines 62 and 120 into a liquid sulfur collection vessel or pit 40.

The remaining stream in line 42 is then reheated in a reheater exchanger 48 and introduced into a direct oxidation catalytic converter reactor 52 for converting hydrogen sulfide into sulfur where residual $H_2S$ and $SO_2$ are reacted to produce additional sulfur and water. The reacted stream is carried through line 54 on into a second condenser 56, which again cools the effluent stream. The condensed liquid sulfur is then carried through line 62 and then line 120 into the liquid sulfur collection pit 40.

The treatment of the effluent stream is then repeated. The remaining stream now in line 64 is reheated in a reheater exchanger 66 and then introduced into a second direct oxidation catalytic converter reactor 70 wherein a similar catalytic reaction producing still more sulfur and water occurs. The reacted stream is carried through line 72 into a third condenser 74. The condensed liquid sulfur is then carried through line 80 into line 120 and on into the collection pit 40.

In the embodiment shown in FIG. 1, the catalytic reaction is repeated a third time. The effluent stream now is carried by line 82 to a reheater exchanger 84 and then transported by line 86 into a third direct oxidation catalytic converter reactor 88. The reacted stream is carried through line 90 into a final condenser 92. The condensed liquid sulfur is then carried through line 96 into lines 80 and 120 and on into the collection pit 40.

The final effluent comprised predominantly of steam, nitrogen, carbon dioxide, hydrogen and residual hydrogen sulfide and other sulfur compounds is transported by line 100 into a tailgas cleanup unit 113 where the bulk of the residual sulfur constituents are recovered to meet sulfur emission environmental standards, typically by conversion to hydrogen sulfide, which is returned to the acid gas feed 10 through line 102. The residual gas from the tail gas cleanup unit is sent in line to an incinerator burner 112 that is fired with natural gas from line 108 and air from line 110. The thermal incinerator coverts the hydrogen sulfide to sulfur dioxide. The materials are then vented in stack 114, at an acceptable sulfur content level, as an effluent 116 to the atmosphere. Alternatively, the tail gas 100 bypasses tail gas cleanup unit 113 in line 106 and directly feeds incinerator burner 112.

Figure 2:
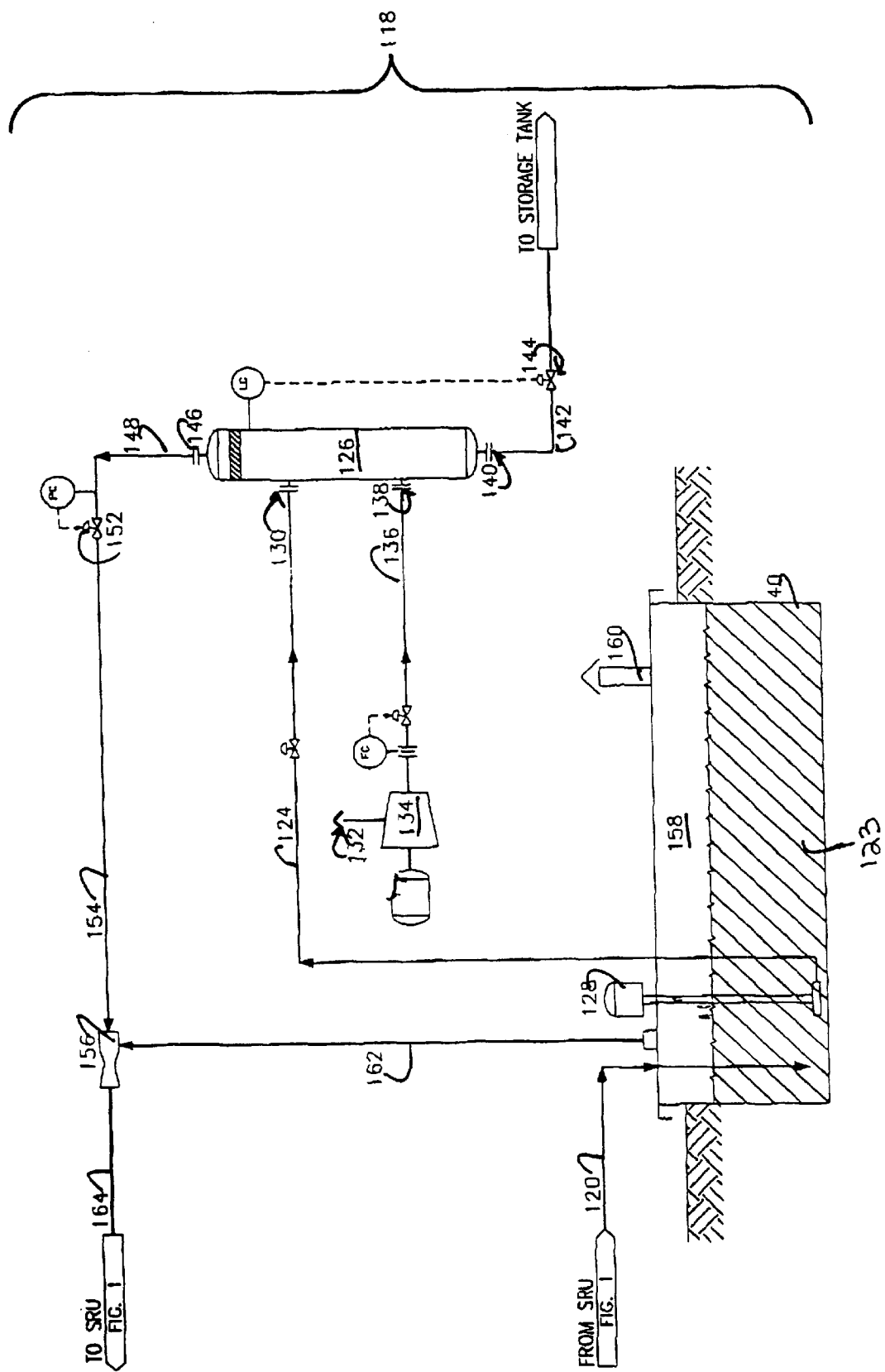
FIG. 2 is a schematic diagram showing a liquid sulfur collection pit and related equipment for use in practicing the inventive method.

Details of the liquid collection pit and the related degassification system, collectively 118, are best seen in FIG. 2. Liquid streams carried in lines 38, 62, 80, and 96 are combined into a single line 120 (FIG. 1) and flow into pit 40. The liquid sulfur 123 is pumped out of the pit through line 124 and into a degassing vessel 126 by liquid sulfur pump 128. The liquid sulfur is introduced, at a pressure of at least about 60 psig, into the upper portion of the vessel through a liquid sulfur inlet 130. Preferred pressures are from about 80 to about 120 psig, with a pressure of about 100 psig being most preferred.

A stream of an oxidizing gas 132 is pumped from air supply 132 by a compressor 134 through line 136 into the degassification vessel 126. The oxidizing gas is introduced, at a pressure of at least about 80 psig, into the lower portion of the degassification vessel 126 through an oxidizing gas inlet 138. Preferred pressures for the stream of oxidizing gas are from about 100 to about 140 psig, with a pressure of about 120 psig being most preferred. In an alternative embodiment, a source of air, at a pressure of 80 psig or greater, can be used without a dedicated compressor.

Any suitable oxidizing gas can be employed. Representative oxidizing gases include air, oxygen-enriched air, mixtures of gases containing oxygen, sulfur dioxide and sulfur dioxide-enriched gases. Air or oxygen-enriched air are preferred. Both the liquid sulfur and oxidizing gas streams are heated to a temperature of from about 265° F. to about 285° F., preferably about 275° F., before they enter the degassification vessel 126.

While in the vessel 126, the stream of liquid sulfur and the stream of oxidizing gas are mixed to provide intimate contact between the two streams. The two streams flow counter currently through the degassification vessel at a pressure of at least about 60 psig, preferably from about 80 to about 120 psig, more preferably about 100 to about 120 psig.

The gas and liquid streams flow through the degassification vessel at a temperature of about 265° F. to about 285°

F., preferably about 275° F. The residence time in the degassification vessel is sufficient to produce a stream of degassed liquid sulfur and a stream of H$_2$S-containing gas. The residence time is generally less than about one-half hour. Residence time as used herein means the superficial or apparent residence time, i.e., the residence time assuming that the degassification vessel is empty.

After passing through the degassification vessel 126, the degassed liquid sulfur exits through an outlet 140 into line 142. The line 142 includes a level control valve 144 for controlling the level of the liquid sulfur in the degassification vessel. A pump delivers the degassed sulfur to a storage tank (not shown).

The residual waste gas stream, which may contain H$_2$S, SO$_2$, carbon oxide sulfide and/or carbon disulfide, exits though an outlet 146 into line 148. Line 148 includes a valve 152 for controlling the pressure of the gas in the vessel. The pressure of the residual gas stream in line 148 is at least about 60 psi, preferably from about 80 to about 120 psi and most preferably about 100 psi.

The residual gas stream is then carried at the pressure of at least about 60 psi, preferably from about 80 to about 120 psi, and most preferably about 100 psi, through line 154 to eductor 156, where the waste gas serves as the motive fluid. The eductor draws sweep gas through line 162 from the vapor space 158 of the collecting pit 40. The withdrawn sweep gas is replenished from atmospheric air through sweep air inlet 160. It is an advantage of the inventive method that power consumption is minimized by eliminating the requirement for all, or a large portion, of the compressed air from an external source used as the eductor motive fluid in conventional systems. Using the waste gas rather than steam for the eductor motive fluid also provides process advantages and energy savings for the SRU 8. The absence of motive steam in the waste gas to the SRU increases capacity by reducing the flow of process gases throughout the SRU, the tail gas flow 100 to the tail gas cleanup unit 113 and process flow 104 to incinerator burner 112. This reduction in the flow of process gases increases the capacity of the SRU, which is normally limited by pressure drop through the unit. Using waste gas rather than motive steam to drive the eductor also removes diluent steam from SRU thermal conversion step 22 and catalytic conversions 52, 70, and 88. Removal of the steam diluent increases furnace temperature and thermal conversion of H$_2$S to sulfur and also increases catalytic conversion of H$_2$S to sulfur. It is a further advantage of the invention that the usage of treated water is reduced by eliminating the use of steam as the motive fluid for the pit sweep eductor.

The resulting waste gas stream, a combination of the residual gas stream and the sweep gas, is discharged from the eductor through line 164. The pressure of the waste gas stream in line 164 is at least about 6 psig, preferably from about 8 psig to about 14 psig and more preferably about 12 psig.

In the embodiment shown in FIG. 1, the waste gas is carried through line 164 and combined with air stream 14 for recycling, beginning with combustion. The waste gas provides a portion of the combustion air for the burner 20, and the sulfur compounds contained in the waste gas are subsequently converted to elemental sulfur and recovered as a liquid product along with the sulfur recovered from the acid gas feed.

Figure 3:
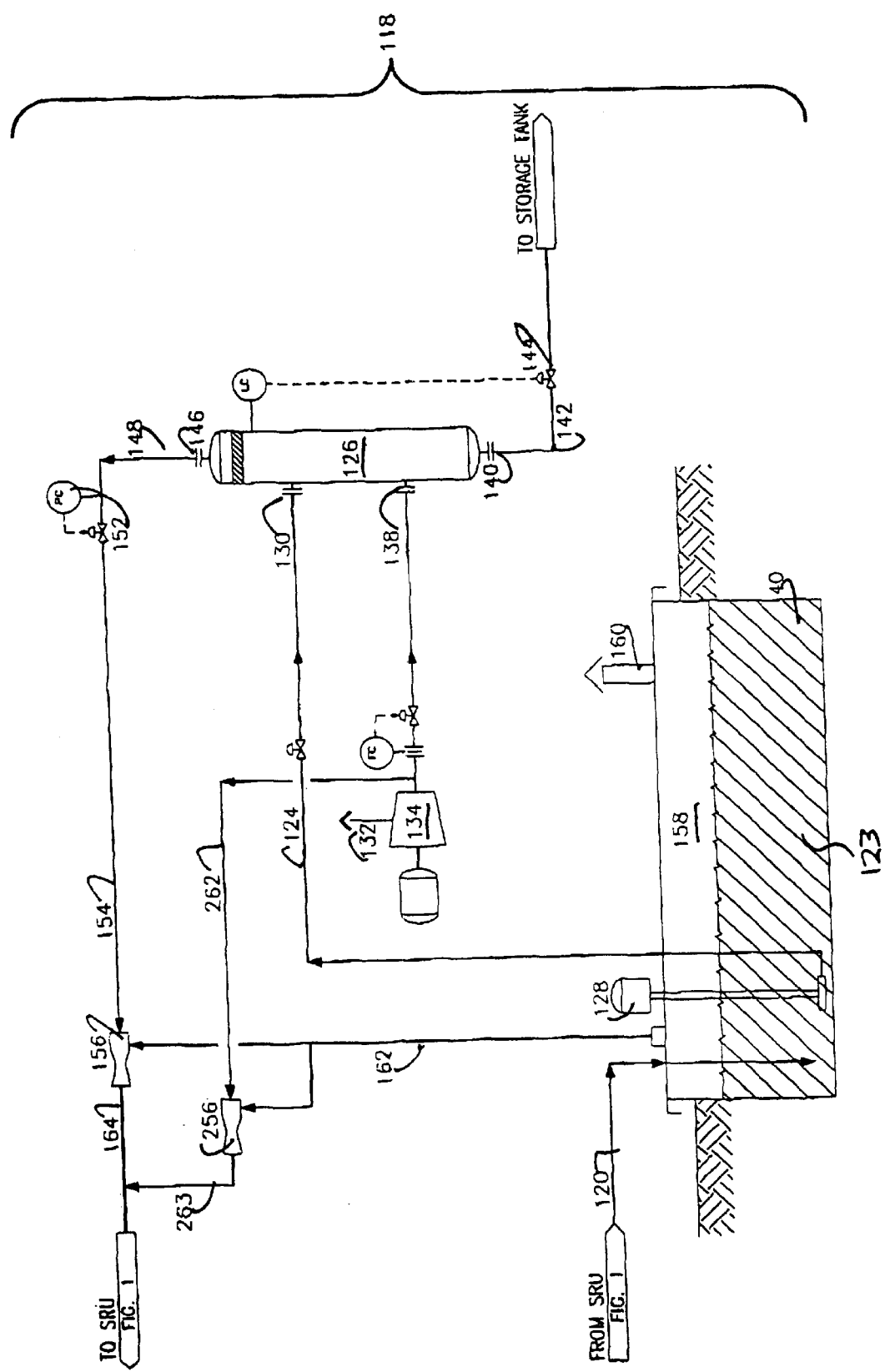
FIG. 3 is a schematic diagram showing a first alternative embodiment of a liquid sulfur collection pit and related equipment for use in practicing the inventive method.

In the embodiment shown in FIG. 3, a second sweep eductor 256 assists in inducing sweep air flow through the vapor space 158. The second sweep eductor uses, as the motive fluid, air provided through line 262 by air compressor 134. The resulting waste gas is carried by a line 263 to a line 164. The gases from both eductors are then routed through the SRU. It is an advantage of this embodiment, that the combination of two eductors can provide all the air required to sweep the sulfur pit 40, in those embodiments where the air required to sweep the sulfur pit cannot be completely supplied gy the eductor using residue gas stream 154 as motive fluid.

Figure 4:
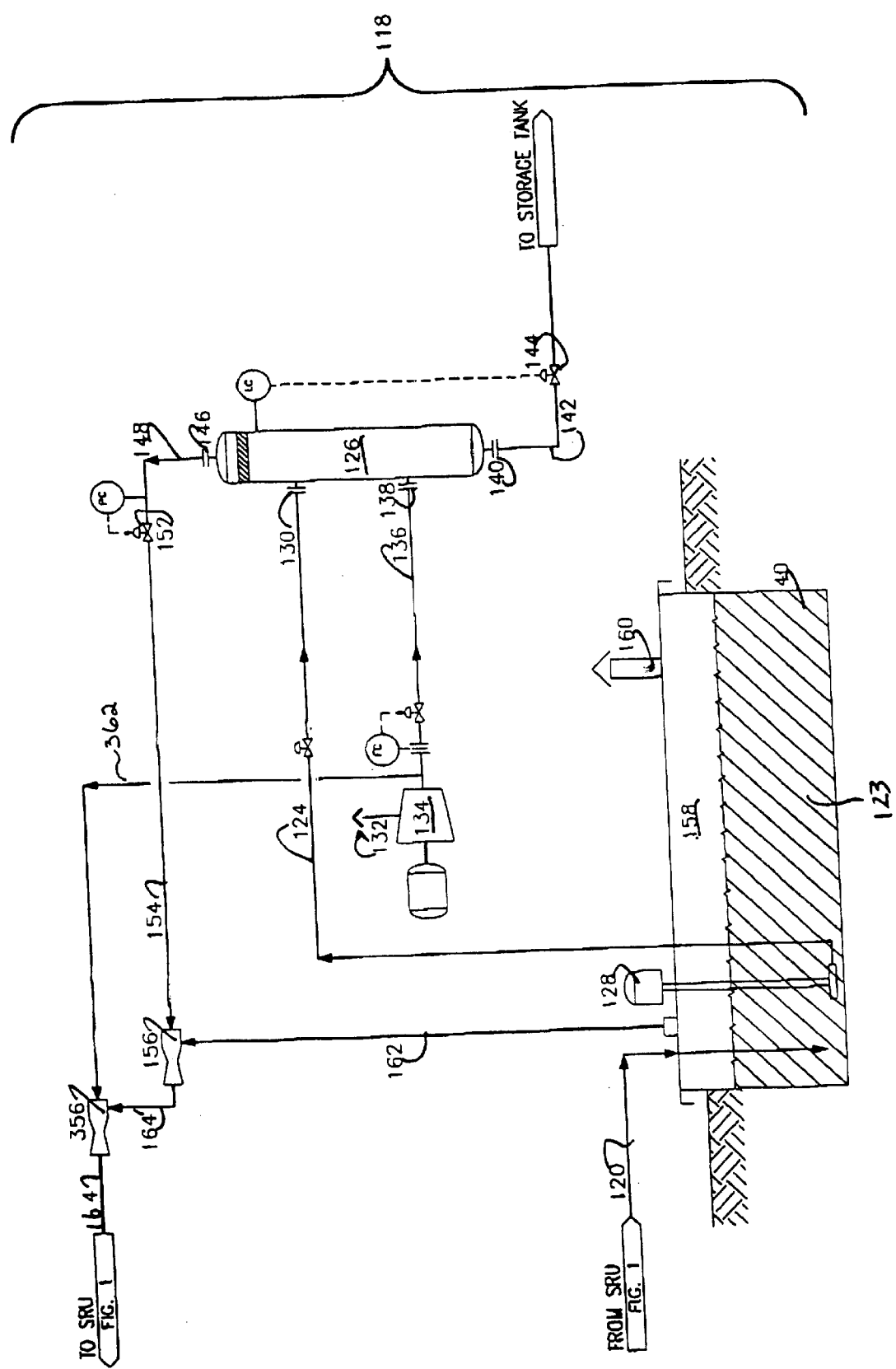
FIG. 4 is a schematic diagram showing a second alternative embodiment of a liquid sulfur collection pit and related equipment for use in practicing the inventive method.

In the embodiment shown in FIG. 4, the waste gas exiting from the first eductor 156 in line 164 is compressed to a higher pressure by second stage eductor 356. The motive fluid for eductor is provided from air compressor 134 through line 362. It is an advantage of this embodiment that the waste gas stream from eductor 356 to the SRU is available at a higher pressure than is practical with a single stage eductor.

In an alternative embodiment, the waste gas is directed to a thermal oxidizer in a Wellman Lord type SRU tail gas clean-up unit. Sulfur compounds contained in the waste gas are oxidized to SO$_2$, which is scrubbed from the resulting gas stream and recycled to the upstream SRU for recovery as liquid sulfur.

In a second alternative embodiment, the waste gas stream are directed to a thermal oxidizer in a sodium bisulfite SRU tail gas clean-up unit. Sulfur compounds contained in the waste gas are oxidized to SO$_2$, which removed from the resulting gas stream by reaction with sodium hydroxide.

In a third alternate embodiment, the waste gas is directed to an SRU catalytic oxidation stage where H$_2$S in the stream is converted to sulfur for recovery. And as seen in FIG. 1, in some embodiments, the waste gas is carried through line 165 to the thermal incinerator burner 112. It is an advantage if this embodiment that the fuel requirement for the incinerator is reduced by the amount of energy otherwise required to heat the motive steam to an exit temperature of over 1200° F. Reducing the incinerator fuel requirement lowers operating costs and reduces carbon dioxide emissions.

While the invention has been described in detail with reference to certain preferred embodiments thereof, it will be understood that modifications and variations are within the spirit and scope of that which is described and claimed.

I claim:

1. A method for treating a hydrogen sulfide-containing waste gas stream comprising the steps of:
  a. introducing hydrogen sulfide-containing liquid sulfur into a containment vessel to partially fill the containment vessel and create a hydrogen sulfide-containing liquid sulfur phase and a hydrogen sulfide-containing vapor phase;
  b. treating a portion of the hydrogen sulfide-containing liquid sulfur phase to produce a liquid sulfur-containing phase and a gaseous hydrogen sulfide-containing phase, the gaseous hydrogen sulfide-containing phase having a pressure of at least about 60 psig;
  c. withdrawing a portion of the hydrogen sulfide-containing vapor phase using at least one eductor driven by a motive fluid, where the motive fluid is the gaseous hydrogen sulfide-containing phase; and
  d. treating the hydrogen sulfide-containing waste gas stream exiting the eductor to reduce the hydrogen-sulfide content of the waste gas.

2. The method in accordance with claim 1 wherein the hydrogen sulfide-containing liquid sulfur phase is treated by withdrawing the hydrogen sulfide-containing liquid sulfur phase from the containment vessel and introducing the hydrogen sulfide-containing liquid sulfur phase and an oxidizing gas into a degassing vessel at a pressure of at least about 60 psig.

3. The method in accordance with claim 2 wherein the hydrogen sulfide-containing liquid sulfur phase and an oxidizing gas are introduced into a degassing vessel at a pressure of from about 80 to about 120 psig.

4. The method in accordance with claim 3 wherein in the oxidizing gas is air.

5. The method in accordance with claim 1 wherein the gaseous hydrogen sulfide-containing phase has a pressure of from about 80 psig to about 120 psig.

6. The method in accordance with claim 1 wherein the hydrogen sulfide containing waste gas stream exiting the eductor has a pressure of from about 6 to about 14 psig.

7. The method in accordance with claim 6 wherein the hydrogen sulfide containing waste gas stream exiting the eductor has a pressure of from about 8 to about 12 psig.

8. The method in accordance with claim 1 wherein the hydrogen sulfide-containing vapor phase is withdrawn by one eductor.

9. The method in accordance with claim 2 wherein the hydrogen sulfide-containing vapor phase is withdrawn by two eductors.

10. The method in accordance with claim 1 further comprising, the waste gas stream is used as the motive fluid for an additional eductor prior to treatment of the waste gas stream.

11. The method in accordance with claim 1 wherein the hydrogen sulfide-containing liquid sulfur is produced by a sulfur recovery unit having a burner for combusting a stream of gas and evolving the combustion products into a modified Claus process reactor furnace and the hydrogen-sulfide containing waste gas is treated by feeding the hydrogen-sulfide containing waste gas into the burner.

12. The method in accordance with claim 1 wherein the hydrogen sulfide-containing liquid sulfur is produced by a sulfur recovery unit having a Wellman Lord tail gas clean-up unit for removing hydrogen sulfide from a gas stream and the hydrogen-sulfide containing waste gas is treated by feeding the hydrogen-sulfide containing waste gas into the Wellman Lord tail gas clean-up unit.

13. The method in accordance with claim 1 wherein the hydrogen sulfide-containing liquid sulfur is produced by a sulfur recovery unit having a sodium bisulfite tail gas clean-up unit for removing hydrogen sulfide from a gas stream and the hydrogen-sulfide containing waste gas is treated by feeding the hydrogen-sulfide containing waste gas into the sodium bisulfite tail gas clean-up unit.

14. The method in accordance with claim 1 wherein the hydrogen sulfide-containing liquid sulfur is produced by a sulfur recovery unit having a catalytic converter for direct oxidation for converting hydrogen sulfide to sulfur and the hydrogen-sulfide containing waste gas is treated by feeding the hydrogen-sulfide containing waste gas into the catalytic converter.

15. The method in accordance with claim 1 wherein the hydrogen sulfide-containing liquid sulfur is produced by a sulfur recovery unit having a thermal incinerator for converting hydrogen sulfide to sulfur dioxide thereby removing hydrogen sulfide from a gas stream and the hydrogen-sulfide containing waste gas is treated by feeding the hydrogen-sulfide containing waste gas into the thermal incinerator.

16. A method for treating hydrogen sulfide-containing waste gas stream comprising the steps of:
   a. introducing hydrogen sulfide-containing liquid sulfur into a containment vessel to partially fill the containment vessel and create a hydrogen sulfide-containing liquid sulfur phase and a hydrogen sulfide-containing vapor phase;
   b. treating a portion of the hydrogen sulfide-containing liquid phase to produce a liquid sulfur-containing phase and a gaseous hydrogen sulfide-containing phase, the gaseous hydrogen sulfide-containing phase having a pressure of from about 80 to about 120 psig;
   c. withdrawing a portion of the hydrogen sulfide-containing vapor phase using at least one eductor driven by a motive fluid, where the motive fluid is the gaseous hydrogen sulfide-containing phase; and
   d. treating the hydrogen sulfide-containing waste gas stream having a pressure of from about 6 to about 14 psig as it exits the eductor to reduce the hydrogen-sulfide content of the waste gas.

17. The method in accordance with claim 16 wherein the hydrogen sulfide-containing liquid sulfur is produced by a sulfur recovery unit having a burner for combusting a stream of gas and evolving the combustion products into a modified Claus process reactor furnace and the hydrogen-sulfide containing waste gas is treated by feeding the hydrogen-sulfide containing waste gas into the burner.

18. A method for treating hydrogen sulfide-containing waste gas stream comprising the steps of:
   a. producing hydrogen sulfide-containing liquid sulfur in a sulfur recovery unit having a burner for combusting a stream of gas and evolving the combustion products into a modified Claus process reactor furnace,
   b. introducing the thus produced hydrogen sulfide-containing liquid sulfur into a containment vessel to partially fill the containment vessel and create a hydrogen sulfide-containing liquid phase and a hydrogen sulfide-containing vapor phase;
   c. withdrawing a portion of the withdrawn hydrogen sulfide-containing liquid phase from the containment vessel and introducing the withdrawn hydrogen sulfide-containing liquid phase and air into a degassing vessel at a pressure of from about 80 to about 120 psig;
   d. withdrawing a portion of the hydrogen sulfide-containing vapor phase using an eductor driven by a motive fluid, where the motive fluid is the gaseous hydrogen sulfide-containing phase; and
   e. feeding the hydrogen-sulfide containing waste gas having a pressure of from about 6 to about 14 psig into the burner to reduce the hydrogen-sulfide content of the waste gas.

* * * * *